United States Patent

Marshall, III et al.

[11] 3,991,611
[45] Nov. 16, 1976

[54] DIGITAL TELEMETERING SYSTEM FOR SUBSURFACE INSTRUMENTATION

[75] Inventors: J. Howard Marshall, III, Pasadena; Timothy M. Harrington, Sierra Madre, both of Calif.

[73] Assignee: MDH Industries Inc., Monrovia, Calif.

[22] Filed: June 2, 1975

[21] Appl. No.: 582,987

[52] U.S. Cl. .................................. 73/151; 340/18 P
[51] Int. Cl.[2] ........................................ E21B 47/00
[58] Field of Search ............... 73/151, 152, 154; 340/18 R, 18 FM, 18 P; 250/256, 257

[56] References Cited
UNITED STATES PATENTS

| | | | |
|---|---|---|---|
| 3,388,375 | 6/1968 | Sloughter | 340/18 R |
| 3,821,696 | 6/1974 | Harrell et al. | 340/18 P X |

Primary Examiner—Jerry W. Myracle
Attorney, Agent, or Firm—Arthur V. Doble

[57] ABSTRACT

An improved digital telemetering system for conveying information from a subsurface measuring device to a receiving station located at the other end of the cable used to lower and retrieve the measuring device is disclosed. The information being telemetered is converted into digital form within the subsurface measuring device and is communicated as digital numbers over the telemetry link for recording, display and interpretation at the receiving station. A single insulated wire within the hoist cable can convey all signals and the electrical power to the subsurface equipment. The outer sheath of the hoist cable provides the return circuit. A decoder circuit located within the surface equipment recovers the data and converts them to useful information. The system can be adapted to handle data from several sources simultaneously and can act as a communication link in both directions without the need for added conductors in the hoist cable.

23 Claims, 8 Drawing Figures

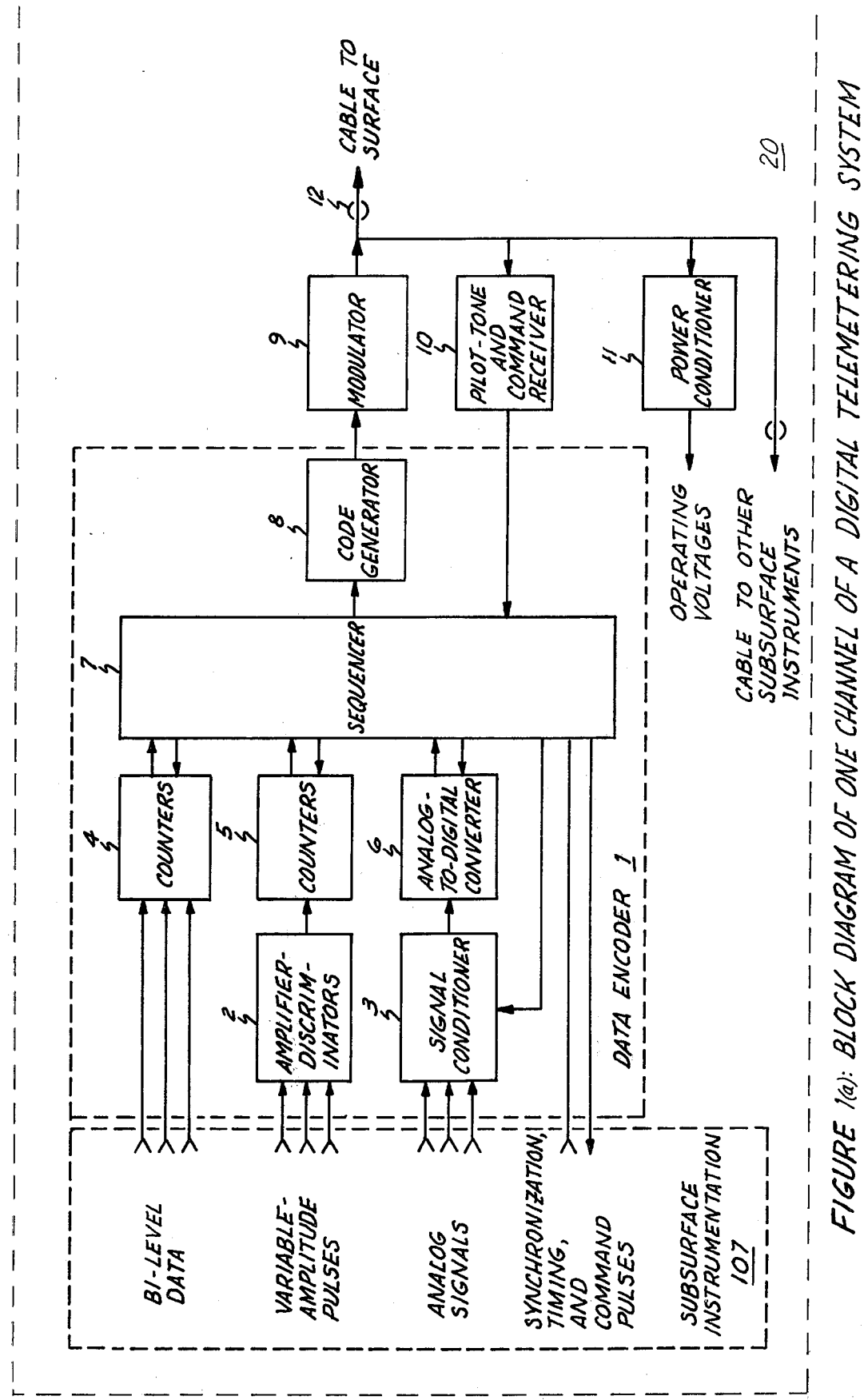
FIGURE 1(a): BLOCK DIAGRAM OF ONE CHANNEL OF A DIGITAL TELEMETERING SYSTEM

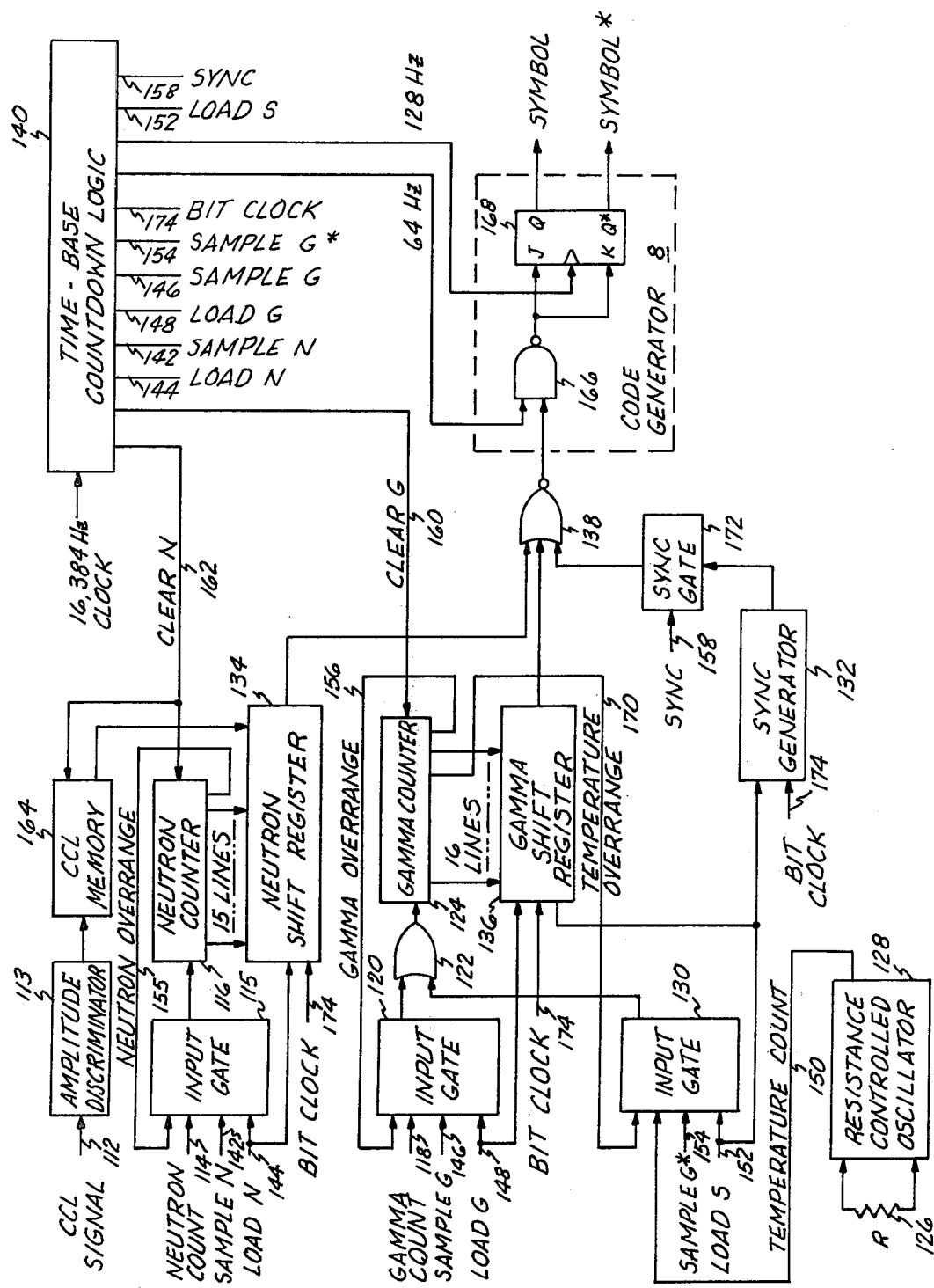
FIGURE 2  DATA ENCODER LOGIC DIAGRAM

FIGURE 5 DECOMMUTATOR AND SYSTEM CLOCK

PILOT-TONE AND COMMAND RECEIVER

DIGITAL TELEMETERING SYSTEM FOR SUBSURFACE INSTRUMENTATION

BACKGROUND OF THE INVENTION

1. Field of the Invention

This invention relates to apparatus for telemetering singals in an electronic circuit over long distances and more particularly to digital data-telemetry links utilizing an encoder at the data transmitting end of a system, a decoder at the receiving end, and a cable transmission link connected therebetween.

2. Description of the Prior Art

Every since man began to extract oil, gas and other minerals from beneath the surface of the earth on a commercial basis, there has been a need for determining the environmental characteristics existing at various depths in a borehole. In the earliest days of petroleum and mineral exploration, such boreholes were not excessively deep, and the required information concerning the environment was not particularly complex. As a result, the logging instruments used to acquire such information were basically simple and did not have to operate in particularly hostile surroundings.

However, as shallow petroleum and mineral deposits were exploited, boreholes became ever deeper and more expensive, requiring not only an increase in the sophistication of drilling techniques but also improved knowledge with increasing detail and reliability about the rock formations through which the borehole passed. Furthermore, the increased scarcity and value of petroleum and mineral products often led to secondary-recovery projects, further adding to the requirement for more detailed knowledge of the rock formations and the fluids contained in them. This added information often had to be obtained in an increasingly hostile environment characterized by high temperatures and pressures and by long cables for data transmission and control of the subsurface equipment.

As logging cables became longer and correspondingly hotter, their losses at both high and low frequencies became more severe. As a result, signals transmitted over long cables were attenuated and otherwise distorted, causing amplitude measurements at the surface to have reduced accuracy owing to large unstable attenuation ratios and contamination by noise. This problem was particularly severe whenever the amplitude of relatively narrow pulses was important, because the high-frequency attenuation and distortion of long cables tended to be considerably larger than those at low frequencies. These attenuation and distortion effects were also objectionable for shorter cables whenever newer sophisticated subsurface instruments required more precise amplitude analysis than that required by older instruments.

Limited cable bandwidth also caused problems even when standard-amplitude pulses were used and only their average rate of arrival was important. In that case the limited cable bandwidth forced the transmission of pulses with widths considerably longer than that required by detectors and signal-processing electronics alone, thus often providing the limiting factor with regard to pulse rates and dynamic range in frequency. Furthermore, the direct transmission of pulses with random spacings caused problems involving the accidental occurrence of two pulses nearly simultaneously within the restricted response time of the cable, limiting the permissible average pulse rates even beyond that limit required for signals with fixed minimum pulse spacings. This pulse-pileup problem became more severe whenever pulse-amplitude information was desired, adding to the errors from attenuation, distortion and noise.

One solution to this problem known in the prior art involved preventing a second pulse from being sent up the cable until a first pulse had sufficient time to decay to a negligible level. Although this fixed-dead-time technique avoided amplitude and count-rate distortions from pulse pileup, it limited the rate at which information could be transmitted to the surface and sometimes resulted in unacceptable statistical variations. The presence of such fluctuations, in turn, limited the speed with which the formations could be logged, and in extreme cases they have actually forced the logging tool to remain stationary at discrete points instead of moving constantly to provide a continuous record.

For the case where only average pulse repetition rates were important, several other partial solutions to the pulse-pileup problem existed in the prior art. Sometimes a digital counter reduced the raw counting rates to a level consistent with the cable bandwidth. Although this technique did not directly increase the statistical variations for random signals, it did add errors at low counting rates where the lost data contained in the state of the prescaler were significant. Making the length of the prescaler controllable from the surface alleviated this difficulty by adapting the prescaler to the measured counting rate, but the required two-way communications link and its associated complexity were seldom justified. Alternatively, de-randomizing scalers which provided an output frequency which was a short-term average of the input frequency avoided much of the pile-up problem caused by random pulse spacings, but still the upper operating frequency remained severely limited by the restrictive cable bandwidth.

A second class of problems arose because of the need to transmit information from several data sources. For example, in a logging tool for correlating formation parameters with pipe position as defined by counting pipe (casing) collars, a neutron source together with gamma-ray and neutron detectors has often been used in the prior art. Including the need to detect the casing collars, such a tool already has three data sources. Monitoring other parameters indicative of proper tool operation, such as temperature, or indicative of further formation properties, such as natural gamma radiation, further increased the need for handling multiple data sources.

This problem became even more severe for more sophisticated tools such as those employing neutron generators capable of being rapidly pulsed on and off. Even though the interaction of neutrons with the material surrounding the tool was very complex, the limited capacity of prior-art data-transmission systems forced the specialization of such tools, allowing them to observe and record only a small fraction of the parameters characterizing the neutron interaction. As a result, the prior art contained neutron-lifetime tools, porosity tools, chlorine logs, shale indicators, aluminum-activation logs, carbon-oxygen and calcium-silicon logs, sodium logs, magnesium logs, and devices for the detection of uranium. However, no one tool performed more than a few of these functions, whereas in a single hole many such parameters were important and failure to measure some of them sometimes led to an incorrect interpretation of the ones which were measured.

One prior-art technique for increasing the capacity of the data link involved encoding the pulses produced by one data source as positive pulses and those produced by another source as negative pulses and then using this polarity difference at the surface to identify the data source. Not only did this technique have the obvious disadvantage of there being only two polarities and thus only two permissible data sources, but also the limited cable bandwidth and the networks used to couple the pulses to the cable conspired to produce pulse ringing and undershoots, which sometimes confused positive- and negative-signal information. As a result, careful adjustment by trained personnel was often required to obtain even marginally acceptable performance. In addition, the pulse-pileup problem became worse because now two data sources were sharing the limited-bandwidth cable, and they could interfere with each other as well amongst themselves.

Another prior-art method for increasing the information capacity of logging cable without the above disadvantages involved the use of multi-conductor cable, which sometimes was driven as a high-frequency balanced transmission line. However, multi-conductor logging cable was not only expensive, but also it was still severely restricted in bandwidth in long lengths and possessed deleterious interactions between adjacent conductors. Also, because of its large diameter, it was difficult to use in small-diameter tubing or in deep boreholes and often had problems in high-pressure wells, particularly at the pressure interface at the top of the borehole.

Thus, the use of a coaxial monocable with a single center conductor shielded by a load-bearing outer wall remained essential for many logging tools. This approach required that the single center conductor provided operating power for the subsurface equipment as well as a data link. Consequently, the limited cable bandwidth had to be shared between power sources and data sources, further complicating the design and adjustment of the pulse-coupling networks, particularly whenever bi-polar pulses from two data sources were used.

These problems notwithstanding, even more information was imposed on the monocable. For example, casing-collar-locating pulses were applied to the cable, with their relatively long duration distinguishing them from other data sources. Similarly, commands were sent from the surface to subsurface equipment by varying a dc potential on the line. This latter technique was often used to switch between tools connected to the same cable to avoid the need for withdrawing the tool string completely from the hole to change tools whenever the required number of measurements caused the information capacity of the cable to be exceeded. However, inefficiently-used cable bandwidth was still limiting the flexibility and accuracy of the logging operation, causing the same formation to be logged several times in order to obtain all of the necessary information.

Other prior-art approaches to this problem involved analog frequency-modulation (FM) techniques and tone-burst commands. These approaches at least avoided inaccuracies resulting from unstable cable attenuations. However, both analog FM and tone bursts as they were used in the prior art made ony limited use of the full capability of the cable. Analog FM in particular had the usual stability, accuracy and dynamic-range problems of any analog telemetry system, which were compounded whenever several subcarriers handling different data sources were required.

In summary, the prior-art systems have been characterized by several disadvantages which were sufficiently severe to limit unnecessarily the quality and amount of data obtainable in the borehole-logging process. Many such systems were basically analog telemetry links, which were susceptable to the well-known problems in analog systems involving resolution, dynamic range, amplitude stability, signal distortion and noise. These problems were present in systems employing slowly-varying voltage or current signals, pulse-amplitude measurements or frequency-modulated carriers. Furthermore, even for data links which were basically pulse-counting systems that did not convey information by pulse amplitude, pulse-pileup effects and interferences between multiple data sources often limited instrument performance.

Although sometimes counting rates and frequencies could be chosen initially or controlled by signal processing to provide an acceptable data quality, severe limitations were often still present with regard to tool-pulling speed, the number of data sources which could be handled simultaneously, the range of parameters over which precise operation was possible, and the ability of the surface equipment to control subsurface operation. Prior-art techniques used to overcome these problems often resulted in the need for precise adjustments and data interpretation by expensive, well-trained personnel, basically marginal operation, or the need for expensive, hard-to-use multi-conductor cable.

SUMMARY OF THE INVENTION

With the advent of inexpensive integrated circuits suitable for subsurface equipment, it now becomes feasible to construct an improved digital telemetering system for transferring data between subsurface instrumentation and equipment located in the vicinity of the surface. Digital systems of the form disclosed herein are characterized by high accuracy; independence of cable attenuation, distortion and noise; optimal use of the available cable bandwidth; ability to handle multiple data sources in a non-interfering manner; adjustment-free operation; and a high degree of flexibility including two-way communication along a single pair of conductors. The system is applicable to a monocable and can increase the accuracy, flexibility and information rates of multi-conductor cables as well.

This digital telemetry system contains four major elements including: (1) an encoder located at the data source, (2) a modulator located near the encoder, (3) a demodulator located at the other end of the cable where data is to be received, and (4) a decoder located near the demodulator. The encoder arranges either analog or digital information to be telemetered into a series of digital values, which are communicated one bit at a time to the modulator and contain any necessary synchronization or identification patterns. The modulator places this serial data onto the cable in a suitable fashion for error-free reception by the demodulator at the other end of the data link. The demodulator reconstructs the serial data from the appropriate signals on the cable and provides digital data to the decoder. The decoder converts these digital signals into data bits, synchronizes itself to the data pattern and reproduces the original digital numbers that represented measured quantities at the other end of the data link.

In one specific embodiment described herein, the data source consists of two pulse rates from two nuclear detectors placed in a subsurface instrumentation package, a casing-collar locating signal, and a temperature-sensitive resistance. The encoder digitizes the analog parts of this information and counts the input pulses during 0.5-second intervals and formats the resulting data into 16-bit words and 9-word frames, each of which includes a 7- or 16-bit synchronizing pattern. The data rate is 64 bits per second, implying that 2.25 seconds are necessary to transmit a complete frame. Thus, each detector has its average counting rate sampled and transmitted to the surface once every 0.5 seconds, and the data link can transmit all of the significant bits of the averaging counter together with temperature and collar-locating signals within a data rate of 64 bits per second. In that most prior-art systems required data rates near 10,000 pulses per second to transmit only the detector and collar-locating information, this data compression illustrates the large increase in efficiency in use of the limited cable bandwidth provided by downhole digital data processing coupled with a digital telemetry link.

The encoder also changes the non-return-to-zero (NRZ) data into bi-phase data, which consist of a series of high and low signal levels, with there always being a transition from high to low or vice versa at the edge of a bit interval, and with there being a transition in the center of the bit interval only if a binary 1 is to be transmitted. Bi-phase data are relatively simple to decode and provide information within the signal to allow the decoder to reconstruct bit frequency and timing.

In this embodiment, the modulator uses a 4096-Hz carrier frequency derived by binary division from a 16,384-Hz pilot tone generated at the surface and transmitted to the subsurface equipment over the same cable carrying the output data. Appropriate filtering, demodulating and coupling circuits permit both of these frequencies to be present on the same line without interference and also permit other carrier frequencies equal to other rational fractions of the pilot frequency to carry data from other sources simultaneously. Phase-shift-key modulation is used wherein the phase of the carrier is changed by 180° whenever the encoder data output changes state. Because the bi-phase code identifies data ones and zeros by the presence or absence of transitions, the phase shifts and not their absolute values contain the information. As a result, the ultimate data-rate capability of a 4-kHz carrier considerably exceeds the 64 bits per second actually used here, and the carrier frequency itself could also be raised considerably. Thus, this technique can be used to transmit data at rates exceeding 10,000 bits per second.

In this embodiment, the demodulator consists of two synchronous rectifiers operated 90° out of phase in order to recover simultaneously data and bit-clock signals from the transmitted data. Synchronous rectification using carrier frequencies with binary relationships also helps to permit multiple carrier frequencies (or pilot tones) to be present on the same line without interference.

The decoder in this embodiment then takes these data and clock signals and constructs from them at the end of each 0.25-second interval a 19-bit word, wherein 3 bits identify the data source and 16 bits indicate the state of the data provided by that source. Ratemeters containing digital filters then process the count-rate data contained in these words for visual display on a meter and by a recorder. An output for digital recording and computer processing is also available.

Two methods are available for communicating from the surface to the subsurface instrumentation as well. Phase reversals in the pilot tone can easily provide occasional commands to the subsurface package. If higher bit rates are necessary in this direction, a second data link using a different carrier frequency can transmit data in the opposite direction from the first data link along the same wire.

It is an object of the invention to provide an improved digital telemetering system for subsurface instrumentation.

It is a further object of this invention to provide a system for telemetering data from a subsurface instrument package including subsurface digitizing and formatting of data to transmit information from several sources at reduced information rates.

It is a further object of this invention to provide a digital system for telemetering data from a subsurface instrument package using a modulated carrier signal.

It is a further object of this invention to provide a system for telemetering data from subsurface instrumentation utilizing bi-phase, phase-shift keying for modulation of a carrier signal.

It is a further object of this invention to provide a system for telemetering data from subsurface instrumentation using multiple carriers of different frequencies to transmit data from multiple independent sources over a single wire in either direction.

It is a further object of this invention to provide a system for telemetering data from subsurface instrumentation having a pilot tone for synchronizing transmitted signals between subsurface and surface and for transmitting commands.

It is a further object of this invention to provide a system for telemetering data through a modulator utilizing tuned-transformer coupling and a demodulator utilizing synchronous rectification to permit several carrier frequencies or pilot tones to be present on the same line simultaneously without mutual interference.

It is another object of this invention to provide a system for telemetering data from subsurface instrumentation having a two-way link to send commands down to the subsurface instrumentation and to send data up to the surface instrumentation.

For a better understanding of the present invention, together with other and further objects thereof, reference is made to the following description taken in connection with the accompanying drawings in which preferred embodiments of the invention are illustrated, the scope of the invention being pointed out and contained in the appended claims.

BRIEF DESCRIPTION OF THE DRAWINGS

FIG. 1a is the left-hand portion of a block diagram of one channel of a digital telemetering system for subsurface instrumentation;

FIG. 1b is the right-hand portion of the block diagram shown in FIG. 1a;

FIG. 2 is a detailed diagram of the preferred embodiment of the data encoder shown in FIG. 1;

FIG. 3a is a detailed diagram of the preferred embodiment of the modulator and power conditioner shown in FIG. 1a;

FIG. 3b is a detailed diagram of the preferred embodiment of the power supply and demodulator shown in FIG. 1b;

DESCRIPTION OF THE PREFERRED EMBODIMENT

Figure 1B:
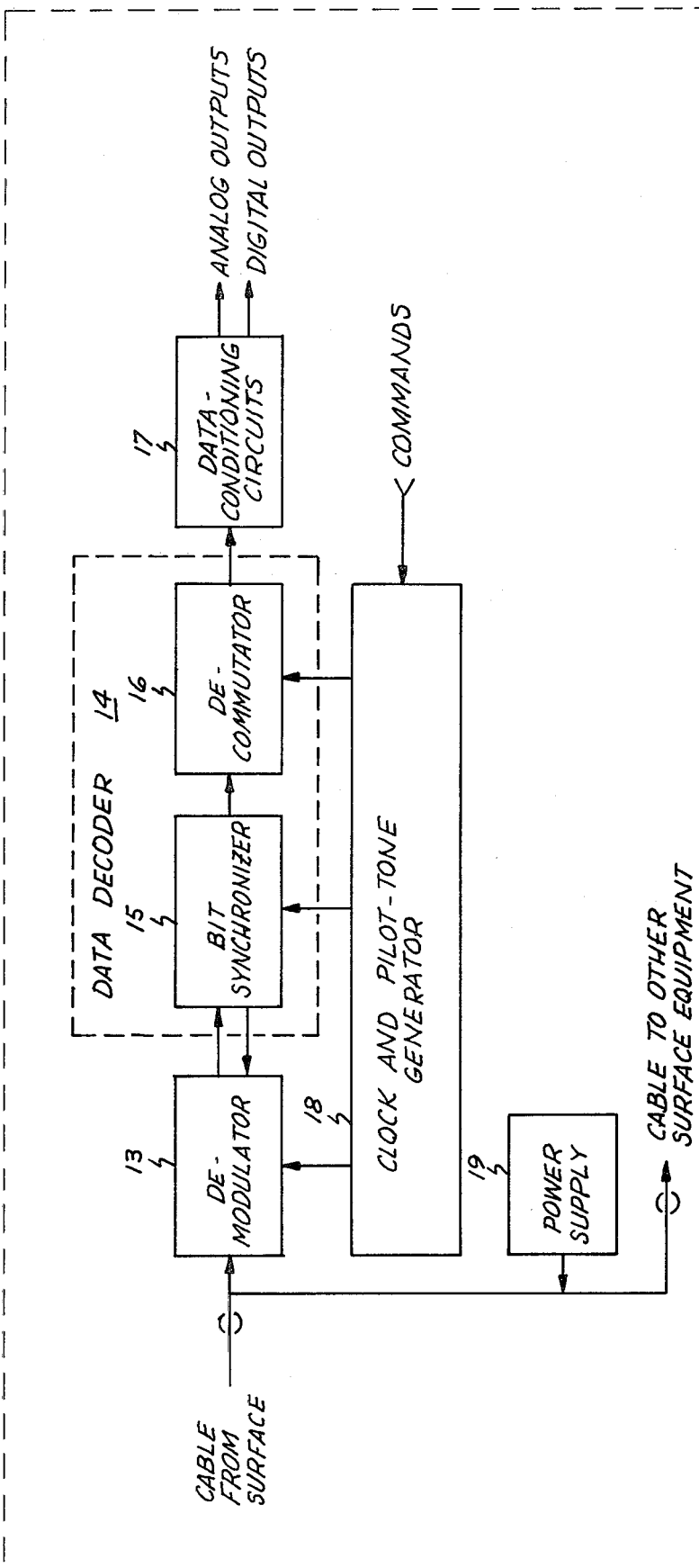

Turning to FIGS. 1a and 1b, there is shown an embodiment of one channel of an improved digital telemetering system 20 for transmitting data from subsurface instrumentation 107 to the vicinity of the surface over a cable 12. As will become apparent during the subsequent discussion, several such data links can apply signals to the same two-conductor cable 12, permitting the cable 12 to handle signals from multiple independent sources using several channels of this type. Furthermore, the direction of information flow need not always be from the subsurface equipment toward the surfacae but could be from the surface toward the subsurface equipment or between two or more equipment packages located beneath the surface. Although the specific configuration shown in FIGS. 1a and 1b is not essential to this invention, it will be used as a specific example for illustrating clearly the operation of this improved digital telemetering system 20.

The basic data link comprises a data encoder 1, a modulator 9, a cable 12 to the surface, a demodulator 13 and a data decoder 14. The system may also comprise a power supply 19 and a power conditioner 11 for sending operating power from the surface to the subsurface equipment along the same cable 12 that transmits the data. The surface equipment, using a clock and pilot-tone generator 18 and a pilot-tone and command receiver 10 in the subsurface equipment, may further provide the subsurface equipment with a standard frequency signal, which can also be used for controlling the operation of the subsurface equipment from the surface. Data-conditioning circuits 17 located at the surface may process further the data-decoder outputs into analog and/or digital signals for recording, display or further processing, possibly by a digital computer.

For the sake of illustrating a specific example, the data encoder 1 shown in FIG. 1a can receive potentially four types of input signals from the subsurface instrumentation 107. One type of input consists of bi-level data for which the average pulse repetition frequency contains the information. Such inputs can pass directly into digital counters 4, which totalize the number of such pulses during known time intervals as defined by other circuits in the data encoder 1. A second similar type of input differs from the first type only in that the amplitude of the input signals may be variable, requiring an amplifier-discriminator 2 to produce bi-level outputs suitable for digital counting in a counter 5.

A third type of input consists of analog information either in the form of the amplitude or shape of relatively-fast pulses or in the magnitude of slowly-varying signals. After these signals pass through appropriate signal-conditioning circuits 3, which may include amplification, pulse shaping, gating and multiplexing, one or more analog-to-digital converters 6 produce a digital representation of the relevant analog quantity characterizing the measured value contained in the input signal. Clearly the same signal could enter both the variable-amplitude-pulse input and the analog-signal input. Finally the subsurface instrumentation 107 can supply to the data encoder 1 synchronization, timing or command pulses to indicate the happening of a specific event or to change the mode of operation of the data encoder 1 or the surface equipment.

It will be clear to those skilled in the art that this invention is not restricted to the four types of inputs shown in FIGS. 1a and 1b. The essential characteristics of the input signals is only that they be capable of being converted to digital form, and telemetered either directly or after processing within the constraints of the information bandwidth. Thus, these four input types have been chosen only for clarity in illustrating the operation of the invention by giving a specific example and should not be viewed as constraining the general applicability of the invention to other signal types.

The digital signals from the input signal-processing circuits comprising counters 4 and 5 and the analog-to-digital converter 6 and from the subsurface instrumentation 107 directly enter a sequencer 7. The sequencer 7 arranges the data inputs from several information sources into a single stream of serial, binary digits, or bits. These bits are generally grouped into words, which may be of fixed or variable length, with each word corresponding to a known information source. In general, words are further grouped into frames, each one of which has a word with a fixed data pattern forming a synchronization word, whereby it becomes possible to identify the position of a given data bit in a sequence of such bits beginning with the first bit in the synchronization word. From the knowledge of the position in the sequence of a given bit, it becomes possible to identify the information source responsible for that bit and the significance of the bit in encoding the value of the signal from that source.

The above described operation of the sequencer 7 is only one possibility of several which are contained in this invention. The essential characteristic of the operation of sequencer 7 is the arrangement of the data bits from one or several sources into a sequence in which the function of a given bit is determined by its place in the sequence. All of the data bits from a given information source do not have to be contiguous, allowing them to be scattered throughout the sequence. Also, the data from the sequencer may be arranged as a multiplicity of serial outputs for use in multi-level encoding schemes or for telemetering to multiple independent data receivers. Furthermore, the synchronization function may be provided by a special signal. This signal could either be generated by the sequencer 7 in order to indicate to external circuits when the frame begins or could be received by the sequencer 7 from external circuits to command the sequencer to begin a sequence. Various combinations of these sequencing techniques could also be employed.

The sequencer 7 further provides the reference time base for controlling the transmission of data, the input signal-processing circuits, and possibly the remainder of the subsurface instrumentation 107. This time base depends, in turn, on a reference frequency provided either internally by the sequencer 7 or received from the surface through the pilot-tone and command receiver 10. In the latter case, the pilot tone can also transmit commands from the surface, which can modify the operation of the sequencer 7 and/or can be passed on by the sequencer 7 to other subsurface equipment.

The data output from the sequencer 7 enters the code generator 8, which in turn controls the modulator 9. The code generator may change the serial, binary data from the sequencer into a digital form which is more suitable for transmission over long lengths of cable. In the preferred embodiment, the code generator produces a bi-phase code containing two symbols for each data bit. This bi-level code always has a transition at the beginning of a bit interval and only has a transition at the center of the bit interval when the bit value being encoded is a 1. The bi-phase code has several advantages including the fact that only the presence or absence of transitions contain information, and no information is conveyed by the absolute value or sign of the signal. As a result, signal bandwidths become restricted, aiding in the design of transmission and decoding circuits, as well as reducing the susceptibility to noise. Furthermore, the code carries its own clocking and bit-synchronizing information in that every bit has at least one transition. As a result, synchronous decoding schemes become feasible and can adapt to changes in bit rates, delay times and noisy transitions, improving the bit-error rate while preserving a simple, low-cost mechanization.

Although the bi-phase code has many advantages, it is not the only code suitable for this improved digital telemetering system 20. It does require a greater bandwidth for the data link because each bit is encoded into two symbols. Thus, if high data rates become a necessity, other codes such as NRZ and run-length-limited codes can be employed. Even higher information rates can be achieved with multi-level codes in which a single symbol encodes more than one bit. On the other hand, the need for very low error rates or unusually high noise levels may be indicating the need for codes containing error-detecting or error-correcting properties such as parity bits, block codes and cyclic codes. Also one can use codes wherein the data receiver interacts with the data transmitter in order to ask the transmitter to repeat incorrectly-received data or to send the same information more than once. These codes effectively use more than one symbol per bit and thus decrease the data rate for a fixed bandwidth. For many applications, the bi-phase code represents a reasonable compromise between these conflicting requirements.

The modulator 9 receives the encoded digital data and any necessary clock frequencies from the code generator 8 and converts these signals into a form which can be applied to the cable 12. The modulator 9 used in the preferred embodiment provides phase-shift keying of a carrier frequency derived from a pilot tone generated at the surface. Because the bi-phase code is a two-level code, it can be converted into a modulated carrier in which the two levels are signified by two carrier signals differing only by a 180° phase shift. Phase-shift keying is also applicable to multi-level codes by making each code level correspond to a specific phase, allowing several levels to be contained in the full 360° of available phases. Phase-shift keying has the advantage that synchronous demodulation produces directly a signal with an amplitude uniquely related to phase so long as the carrier frequency and the demodulation frequency are equal. In that the frequency reference is produced at the surface and is available there, this equality is simply achieved, although it can also be obtained with circuits such as a phase-locked loop operating solely on the clocking information contained in the code. Furthermore, the use of a carrier frequency allows tuned circuits and synchronous demodulation to separate independent signal sources using different carrier frequencies, thus permitting several signal sources to share the same cable. The same technique also allows a two-conductor cable to carry both data signals and the pilot tone.

Other modulation techniques are also feasible, including sending directly the pulses produced by the code generator 8. Frequency-shift keying, tone bursts, frequency modulation and amplitude modulation are typical of common data-transmission techniques which form a part of this invention.

The modulator 9 signals travel up the cable 12 to the demodulator 13 in the vicinity of the surface. Because of its long length, the cable can considerably attenuate these signals, often by a factor of ten or more. In addition, the clock and pilot-tone generator 18 may apply a large-amplitude pilot tone to the cable 12 at this point, making the modulator 9 signals relatively small compared to the total signal level, including noise, on the cable 12 near the surface. Furthermore, more than one modulator 9 may be generating signals, reducing even more the relative amplitude of the particular signal to be detected.

The primary function of the demodulator 13 is to receive these modulated-carrier signals and convert the selected one to bi-level data which represent accurately the output of the data encoder 1 in the subsurface instrumentation. In the preferred embodiment, the demodulator 13 provides this function in cooperation with the bit synchronizer 15, which forms a part of the data decoder 14. The demodulator 13 also contains circuits for adding the pilot tone from the clock and pilot-tone generator 18 to the line.

The demodulator 13 in the preferred embodiment uses a tuned filter to separate the carrier signals from the pilot tone. It then employs synchronous rectification controlled by a demodulation-clock signal with a frequency and phase appropriately chosen by the bit synchronizer 15 to detect the output from a given modulator 9. An amplifier with a two-pole filter smooths the output of the synchronous rectifier to reject frequencies other than those required to pass information at the symbol rate, thus forming, together with the synchronous rectifier, a bandpass filter centered about a frequency equal to the frequency of the demodulation clock. Frequency dividers can derive this frequency from the same reference frequency that supplies the pilot tone which controls the subsurface carrier frequency, thus automatically centering the demodulator bandpass precisely at the carrier frequency to avoid the need for adjustable components and problems with temperature- and age-induced drifts in narrow-band tuned circuits. Furthermore, changing only the frequency of the demodulation clock allows the same circuit to handle a wide range of carrier frequencies. In the preferred embodiment using frequencies in binary steps from 1024 Hz to 8192 Hz with a 16,384-Hz pilot tone, the narrow bandpass of this type of demodulator allows all four of these carrier frequencies to be present simultaneously on the same cable.

One or more demodulators 13 can be programmed to select any one of these frequencies simply by supplying it with a demodulation clock at that frequency. (The use of these specific frequencies is not an essential part of this invention, and they serve only to illustrate the operation of the improved digital telemetering system 20 with a specific example.)

The phase of the demodulation clock must still be determined. Because of the instabilities in the propagation times over cables at variable temperatures with lengths potentially over 5 km, no stable phase relationship can be assumed between the pilot tone and the received modulated carrier. Thus, the demodulator 13 together with the bit synchronizer 15 must determine the proper phase of the demodulation clock from the received carrier signal itself. Because the bit synchronizer 15, as well as the remainder of the data decoder 14, in the preferred embodiment use purely digital techniques to provide a stable, adjustment-free, low-cost mechanization, the demodulator 13 contains discriminators at its output to convert the analog data provided by the filter amplifier into a bi-level form.

In the preferred embodiment, the demodulator 13 contains two independent sets of synchronous rectifiers, filter amplifiers and discriminators, each of which is controlled by a different demodulation clock from the bit synchronizer 15. Both of these clocks have the same frequency and one is shifted in phase with respect to the other by a fixed 90°. It is inherent to the operation of a smoothed synchronous rectifier that if the phase of the demodulation clock with respect to the modulated carrier is chosen to give a null output, then the output from a smoothed demodulator operating from a clock shifted 90° in phase with respect to the first clock will provide a maximum output. Thus, if the bit synchronizer 15 adjusts the phase of the two demodulation clocks such that the smoothed output from the filter amplifier of the demodulator called the "carrier demodulator" is nulled, then the corresponding output from the second demodulator, called the "data demodulator," will be a maximum, providing an optimum representation of the transmitted information. In the preferred embodiment, this process involves adjusting the phase of the demodulation clocks until, on the average, the bi-level output from the discriminator connected to the "carrier demodulator," is equally likely to be a binary 1 as a binary 0.

Other mechanizations of the demodulator 13 are also part of this invention. For example, analog phase-locked loops could control the phase of the demodulation clock and also its frequency if a pilot tone were not used. Various techniques using tuned circuits are also well known to those skilled in the art for detecting phase reversals in a carrier frequency. Furthermore, the filter amplifier need not use two poles but could employ other techniques such as one or multiple poles, gated integration, etc. Finally, if other modulation schemes were used in the modulator 9, then appropriate demodulators 13 would be needed. Included therein are tuned amplifiers for tone-burst detection, ratio and other detectors for FM demodulation, diode detectors for AM demodulation, and multi-level discriminators or analog-to-digital converters for multi-level codes.

The data decoder 14 not onnly supplies the demodulation clocks to the demodulator 13 but also converts the demodulator 13 output into serial data bits along with a correctly-timed bit clock signal. The decommutator 16 within the data decoder 14 then examines this serial stream of reconstructed data bits to locate the synchronization word and uses the location of each data bit with respect to the synchronizattion word to identify the significance of each bit. This decommutation function results in output digital words arranged to convey both the source of a measured parameter and its value. Subsequent data-conditioning circuits 17 can then process selected output words into a form for recording, display or further computation of either an analog or digital nature.

In the preferred embodiment, the bit synchronizer 15 is operating on bi-phase data characterized by transitions at every bit edge at a known frequency determined by binary division from the frequency of the pilot tone. As a result, a digital phase-shifting circuit can select an appropriate phase for a signal, called "bit clock," such that this signal makes transitions at the average time of tht symbol transitions of the received data bits. In order to avoid ambiguous operation for large numbers of data 1's, which have transitions at the center of the bit interval as well as at the boundaries, the synchronization word contains zeros, and the bit synchronizer 15 requires that there always be a detected symbol transition within a reasonable interval centered about a transition in the bit clock.

Other techniques for generating a bit-clock signal are also a part of this invention. The pilot tone is not essential, and a phase-locked loop could determine the frequency as well as the phase of the bit clock. External synchronization signals transmitted directly from the subsurface equipment can facilitate the bit- and frame-synchronization function, and other synchronization techniques might be required or be more appropriate if bi-phase coding of the data were not used.

Turning now to FIG. 2, there is shown a detailed diagram of the data encoder 1 for one of the preferred embodiments. In this particular embodiment, the subsurface instrumentation 107 consists of a detector of neutrons that produces neutron count 114 pulses, a detector of gamma rays that produces gamma count 118 pulses, a locator of casing collars that produces the CCL signal 112 and a temperature-variable resistance 126.

These signals from the subsurface instrumentation are processed as follows. The variable-amplitude casing-collar-locator signal 112 is applied to a pulse-amplitude discriminator circuit 113. The bi-level neutron count pulses 114 and gamma count pulses 118 are applied to input circuit 115 and gate circuit 120, respectively. The temperature-variable resistance 126 is connected to a resistance-controlled oscillator 128. These four signals make up the information about the subsurface environment that will be encoded and transmitted to the surface in this embodiment of the invention. The 16,334-Hz clock from the pilot tone and command receiver 10 provides the input signal to the timebase countdown logic 140 that controls the encoding of the input signals 112, 114, 118 and 126 into a coded binary signal that is applied to the modulator 9.

The encoding of input signals involves three major steps. First the input information is converted into digital numbers, then the numbers are arranged into a sequence of bits, and then this sequence of bits is encoded into signals compatible with the modulator 9.

Conversion of the input information from the detector of neutrons consists of the application of the neutron count signal 114 to the neutron-counter input gate 115, whereby counts are accumulated within the 15-bit neutron counter 116 for 0.5 seconds, after which the count in neutron counter 116 is transferred to neutron shift register 134. Shortly therafter, the neutron counter 116 is reset to zero by the signal clear N 162 and the counting process begins again. In this manner, the number of neutron count pulses that occurred in an 0.5-sec interval becomes a 15-bit binary number located within neutron shift register 134.

Signals associated with input gate 115 in addition to neutron count 114 include sample N 142 that is used to control the duration of counting of the neutron count 114 pulses to always be 0.5 seconds by blocking application of the neutron count 114 pulses for 0.25 seconds during the time that the synchronizing pattern is being transmitted, and load N 144 that briefly blocks application of counts to the neutron counter 116 while the 15-bit neutron-count number is being transferred to neutron shift register 134. This brief blocking of application of counts helps to assure that the transferred number is a correct representation of the number of neutron counts, undisturbed by counting transients within neutron counter 116. A neutron over-range signal 155 blocks all further counts into neutron counter 116 when the count reaches 32,767 pulses. This prevents confusion of data if unexpectedly high counting rates are encountered by causing a count-of-zero indication whenever more than 32,767 neutron counts occur in 0.5 seconds.

The casing-collar-locator signal 112 is converted to a bi-level signals within amplitude discriminator 113 and causes a logic 1 to be temporarily stored in CCL memory 164 whenever it occurs. The CCL memory output is loaded in the most-significant bit of neutron shift register 134 at the same time as the neutron count 114 is loaded into that register, after which CCL memory 164 is reset by clear N 162. The result of the process described above is thus, that a 16-bit number comprising 15 bits of neutron count data and one CCL bit has been constructed and placed in neutron shift register 134.

The information from the detector of gamma rays, the bi-level signal gamma count 118, is converted into a 16-bit number describing the number of gamma rays detected in an 0.5-second interval by a process involving input gate 120, OR gate 122, gamma counter 124, and gamma shift register 136. Gamma count signals 118 are allowed to enter gamma counter 124 via gates 120 and 122 for 0.5 seconds, after which additional counts are blocked by application of the signal load G 148 to input gate 120. Load G 148 serves to prevent incorrect transfer of gamma counts into register 136 in the same manner that load N 144 serves for neutron count data. Load G 148 causes the 16-bit number in gamma counter 124 to be loaded into the 16 bits of gamma shift register 136, after which the counter 124 is cleared to zero by clear G 160. In order to prevent ambiguous data in the event of unexpectedly large rates of gamma count 118 signals, the gamma overrange signal 156 blocks further counting in gamma counter 124 whenever more than 65,537 counts have entered gamma counter 124 by application of said overrange signal 156 to the input gate 120. The signal sample G 146 applied to input gate 120 blocks counting of gamma count 118 signals for 0.25 seconds during each 2-second interval to permit counting of the temp count 150 of the resistance-controlled oscillator 128 via input gate 130 and OR gate 122 during this 0.25-second interval. Application of temp count 150 pulses to gamma counter 124 is controlled by the application of the signal sample G* 154 to input gate 130. This measurement of the oscillator 128 output serves to digitally encode the value of the temperature of the environment of the subsurface equipment. The digital representation of temperature is then transferred to gamma shift register 136 by load S 152, which signal also blocks counts from the oscillator 128 to avoid transfer of incorrect data as discussed above in connection with the reasons for connection of the signal load N 144 to input gate 115. The signal temperature overrange 170 prevents a malfunction of the temperature indicator from affecting the sync code.

The special sequence of bits used to synchronize the date decoder 14 to the transmitted bit sequence is inserted into the data encoder output pattern using the sync generator 132. The synchronizing bits from the sync generator are inserted into the data stream from the encoder once each 2.25 seconds. The 16-bit neutron word from the neutron shift register 134 and the 16-bit gamma word from the gamma shift register 136 are alternated, one word each 0.25-second interval, four times between sync patterns. Thus, a data frame comprises nine 16-bit words, arranged in the order S N G N G N G N G S, etc. The sync word, S, alternately contains the pattern 0100011111111111, and 01000110 followed by 8 bits of temperature-count data. All count data are transmitted most-significant-bit first.

The numbers are arranged in a fixed sequence of bits under control of timing signals produced by the time-base countdown logic 140 which operates in response to the 16,384-Hz clock from the pilot tone and command receiver 10. The sequence of bits is determined by the time at which data words are loaded into the shift registers 134 and 136, and by the action of gate 172. The outputs of the three sources of data are combined in NOR gate 138 and applied to code generator 8. The signals controlling the neutron data are load N 144 and clear N 162. Load N 144 is 60 $\mu$s wide and is followed 60 $\mu$s later by clear N 162, also 60 $\mu$s wide. These signals are delayed 0.25 sec, or one 16-bit word time, from the corresponding signals controlling the gamma data-load G 148 and clear G 160.

The temperature count is inserted into gamma shift register 136, just before the sync word is transmitted, by load S 152. Clear G 160 happens immediately following load S 152, in addition to its occurrence following each load G 148, to prevent combining temperature count 150 with gamma count 118 signals.

The neutron and gamma shift registers and sync generator 132 are continually shifted at a 64-Hz rate by the signal bit clock 174. By proper timing of the load signals and by the shifting zero's through the registers, it becomes possible to combine the register outputs in NOR gate 138. The sync patter is gated into the data stream through gate 138 and gate 172 by the signal sync 158 for convenience in handling the alternate 16-bit sync and 8-bit sync/8-bit temperature words.

The code generator 8 consists of a NAND gate 166 and a J-K flip-flop 168, operating in conjunction with a 128-Hz signal (twice the bit-clock frequency). The output from the NAND gate 166 is a logic 1 during the first one-half of each bit interval due to the signal 64-Hz* connected to the input of gate 166, and is equal to the value of the data stream during the second half of each bit interval due to the connection from the NOR gate 138 to the second input of NAND gate 166. The J-K flip-flop 168 changes state only when its J and K inputs are logic 1 and a clock input is applied. This results in the output SYMBOL (and its logical complement SYMBOL*) changing state at least once each bit interval, and changing a second time whenever the data signal is a logic 1. The code thus produced is termed bi-phase code.

Other designs for this encoder function can be employed and form a part of this invention. Other arrangements of counting circuitry, analog-to-digital conversion circuits, and computing or processing circuits can be added if required.

Figure 3A:
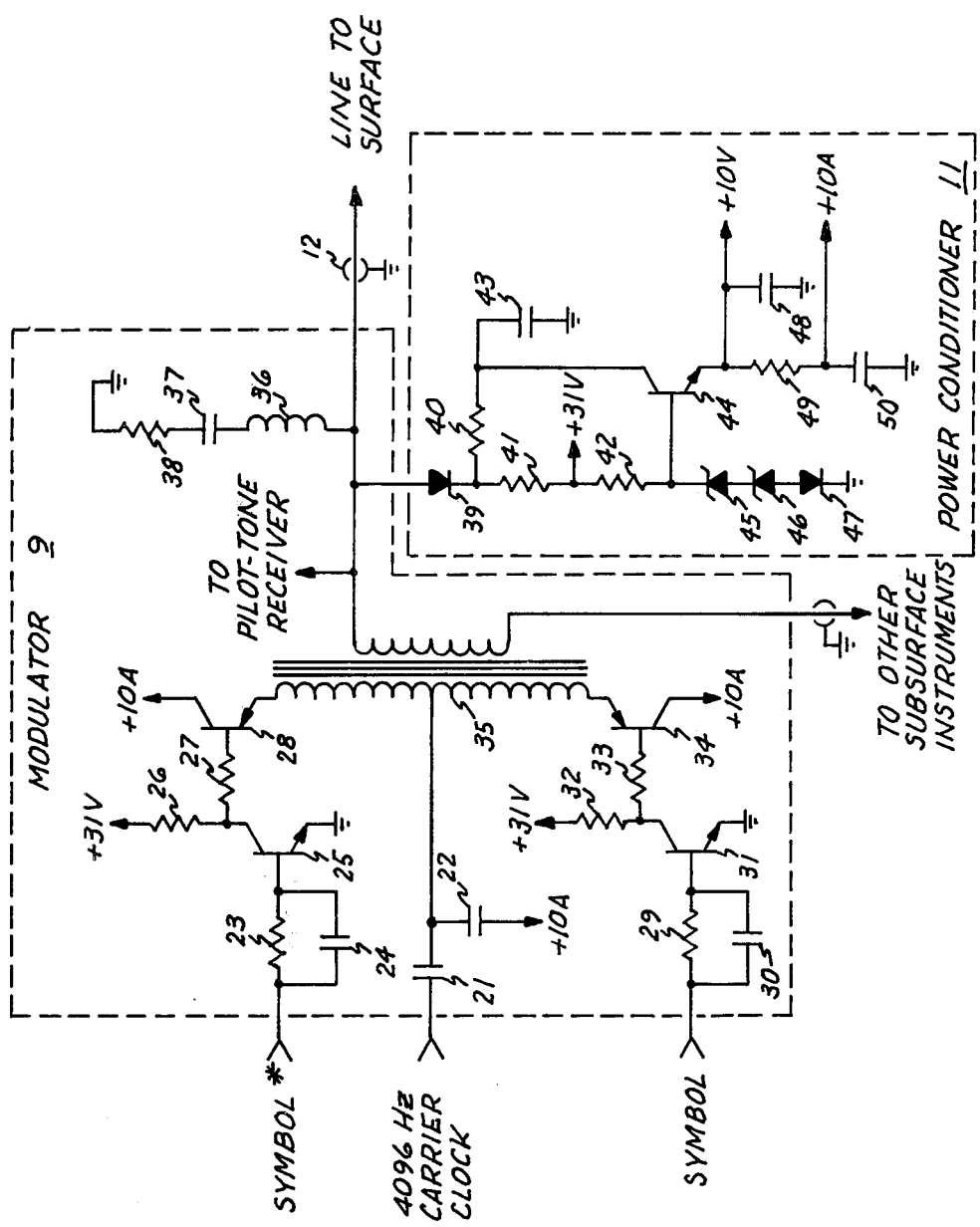

Turning to FIGS. 3a and 3b, one sees, respectively, a detailed diagram of the modulator 9 and demodulator 13 of the preferred embodiment. These figures also illustrate the method for transmitting operating power for the subsurface equipment over the same cable 12 from a power supply 19 to a power conditioner 11.

The modulator 9 receives three binary input signals from the data encoder 1. The CARRIER CLOCK, which has a frequency of 4095 Hz in this example, is a continuous square wave defining the carrier frequency. A transformer 35 with a primary tuned by capacitors 21 and 22 to 4096 Hz converts this signal into mostly-sinusoidal currents applied through the transformer 35 secondary to the cable 12. The phase of these sinusoidal currents depends on whether transistor 28 or transistor 34 provides the return path for the currents introduced at the center tap of the primary winding of transformer 35. The state of the other two input signals, namely SYMBOL and its logical complement, SYMBOL*, determine this conduction state. Transistor 25 with components 23, 24, 26 and 27 permits SYMBOL* to control the conduction state of transistor 28, whereas transistor 31 with components 28, 30, 32 and 33 allows SYMBOL to switch transistor 34. Thus, the modulator 9 under the control of the data encoder 1 can reverse the phase of the carrier signal applied to the cable 12 as the data state changes from a binary 1 to a binary 0, or vice versa, producing phase-shift-key modulation of the carrier.

Because of the desire to avoid noise and other errors caused by reflections traveling back and forth along the cable 12, the impedance seen by signals traveling out of the cable 12 into the modulator 9 should be approximately equal to the characteristic impedance of the cable. This criterion will also insure that the pilot-tone generator 18 can develop a detectable signal across the cable 12 at the modulator 9, without having to supply excessive signal levels at the surface end of the cable 12. Finally the need to connect several modulators in series to allow for the connection of several independent tools to the same cable also requires a defined impedance looking back into the modulator 9 and also a method for permitting signals with frequencies other than that defined by the CARRIER CLOCK for a particular modulator to pass unhindered through that modulator.

The configuration shown in FIGS. 3a and 3b satisfies these impedance and signal passage requirements. The secondary of the transformer 35 referred to the primary appears as a parallel-tuned circuit resonant at 4096 Hz in series with the cable. Thus, it presents a low impedance to other frequencies, which are at least a factor of 2 removed from 4096 Hz, including the 16,384-Hz pilot tone and any other carrier frequencies. If the lower end of the secondary of transformer 35 is connected to an impedance equal to the characteristic impedance of the cable 12, the voltage developed across this impedance at frequencies other than those near 4096 Hz will not be substantially changed by the presence of the secondary of transformer 35. The series-turned network consisting of components 36, 37 and 38 equalizes the impedance at 4096 Hz, so that the impedance at the input of the modulator 9 equals the characteristic impedance of the cable 12 for all carrier and pilot-tone frequencies whenever the cable 12 characteristic impedance loads the output of modulator 9 passing to other subsurface instruments. This load aan either be an appropriate passive network or the input to another modulator associated with other subsurface instrumentation.

The transformer 35 also isolates the dc potential of the line from the modulator 9 input circuits and the data encoder 1. As a result a 38V potential difference can exist between the center conductor and outer shield of the cable 12 and the shield can still be referenced to ground potential as required by the usual methods for cable spooling and handling. A simple power conditioner 11 consisting of zener diodes 45 and 46 and an emitter follower 44 can then supply +10-V power to the subsurface equipment directly from the cable 12. Filtering is provided by components 40, 43, 48, 49 and 50 to avoid transient loads placing noise on the cable, whereas diode 39 protects against reversed polarities on the cable 12 and momentary open circuits. Resistors 41 and 42 supply current to zeners 45 and 46 and divide down the line voltage to generate the 31-V output. Diode 47 provides conpensation for thermally-induced drifts in the emitter-base voltage of emitter follower transistor 44.

Other power-transmission systems besides a dc power supply from a part of this invention. The only essential characteristic of the power system is that it use frequencies other than those used for signal transmission. In that case isolation circuits based on frequency such as those shown in FIG. 3a can separate power-related frequencies from signal frequencies. Although a dc power system clearly uses different frequencies than the 4096-Hz and 16,384-Hz signal frequencies assumed for the preferred embodiment, a power system using 50-Hz, 60-Hz or 400-Hz power-transmission frequencies also satisfies this criterion and would function in a similar manner to the dc system shown in FIG. 3. Other power conditioners 11 could also be used depending on the power-transmission frequency and include dc-to-dc converters and transformer-coupled rectifiers.

The modulated carrier signals travel from the modulator 9 to the surface over cable 12 and enter the demodulator 13. The demodulator 13 consists of a filter 108, a data demodulator 109, a carrier demodulator 110 and discriminators 111.

The signals first enter the filter 108, which separates the pilot tone from the modulator signals and terminates the line for all of these frequencies in its characteristic impedance. In the preferred embodiment, the clock and pilot-tone generator 18 produces a square-wave signal called the 16,384-Hz CLOCK. This signal is applied to the cable 12 through a capacitive divider 52 and 53, which is series resonate at 16,384 Hz with inductor 51 and blocks the dc potentials on the cable 12 from the pilot-tone generator 18. The capacitive division ratio, the value of resistor 54, the source impedance of the pilot-tone generator 18, and the losses in inductor 51 provide an impedance at 16,384 Hz equal to the characteristic impedance of the line. A parallel-tuned circuit consisting of capacitor 56 and inductor 55 resonant at 16,384 Hz isolates the remaining demodulator 13 circuits from the cable 12 at this frequency. Thus, these tuned circuits terminate the cable 12 in its characteristic impedance at 16,384 Hz, and furthermore attenuate the pilot tone in the remainder of the demodulator 13. In addition, the series-resonate circuit reduces the higher harmonics from the 16,384-Hz CLOCK to yield a sinusoidal pilot tone on the cable 12.

At frequencies far removed from 16,384 Hz the series-resonant circuit including components 51, 52 and 53 becomes a high impedance, whereas the parallel-resonant circuit of components 55 and 56 becomes a low impedance. If the output impedance of the power supply 19 is low for carrier and pilot-tone frequencies and if resistor 58 is large compared to resistor 57, then making resistor 57 equal to the characteristic impedance of the cable 12 will terminate the cable 12 with its characteristic impedance for those frequencies. This resistor will also develop a voltage from the modulated-carrier currents traveling up the cable 12, which can pass virtually unhindered through the parallel-resonant circuit of components 55 and 56 and can then be distributed to as many other demodulators as there are carrier frequencies to be detected. Components 58, 59, 60 and 75 also restrict the bandpass for signals proceeding further into the demodulator 13 in order to reject both high- and low-frequency components of noise and electrical interference.

The filtered signals from cable 12 enter the data demodulator 109 through capacitor 60 and carrier demodulator 110 through capacitor 75. These capacitors block the dc potential on the cable 12 produced by the power supply 19. Solid-stage switches 61 and 76, shown schematically in FIG. 3b as double-pole, double-throw mechanical switches, then use the demodulation clocks produced by the bit synchronizer 15 to rectify synchronously the filtered carrier signals. The demodulation clocks for the data demodulator 109 are called DATA PHASE and DATA PHASE*, whereas those for the carrier demodulator 110 are named CARRIER PHASE and CARRIER PHASE*. The rectified output of solid-state switch 61 in the data demodulator 109 enters a one-pole filter amplifier consisting of integrated circuit 70 with feedback and input components 62, 63, 64, 65, 66 and 67. A second pole provided with components 68 and 69 further smooths the amplifier 70 output. Amplifier 85 with components 77, 78, 79, 80, 81, 82, 83 and 84 provides the same function for the rectified signals from solid-state switch 76 in the carrier demodulator 110.

The solid-state switches 61 and 76 alternately connect the outputs of the coupling capacitors 60 and 75 to the inverting and non-inverting inputs of amplifiers 70 and 85. The amplifier 70 or 85 input not connected to the coupling capacitor 60 of 75 is tied to a reference potential which in the preferred embodiment of FIG. 3b is +5V. The demodulation clocks reverse the state of the switches 61 and 76 twice during each period of the carrier frequency to be detected, so that for 50% of each period the switches 61 and 76 are closed in the manner shown in FIG. 3b and for the remaining 50% they contact the other poles. As a result, the average output voltage from the filter amplifiers 70 and 85 equals the 5-V reference voltage plus voltage proportional to the amplitude of the filtered carrier signal with the same frequency as the demodulation clocks. The low-pass filters prevent transients with a zero average value produced by switching action on other carrier frequencies with a binary rational-fraction relation to the pilot tone from reaching the outputs of the data demodulator 109 or the carrier demodulator 110.

The proportionality constant between the average output voltage above the reference voltage and the amplitude of the filtered carrier signal at the input depends on the phase of the demodulation clocks with respect to the filtered carrier signal. This dependence is approximately cosinusoidal so that the magnitude of the output is maximum for in-phase rectification, and in that case a phase change of 180° will reverse the polarity of the output signal. It also follows that if the demodulation clock is 90° out of phase with respect to the carrier signal, then that signal output vanishes and remains zero even if the carrier phase changes by 180°. Thus, the operation of the bit synchronizer 15 which nulls the output of the carrier demodulator 110, which is driven 90° out of phase with respect to the data demodulator 109, will ensure maximum signal excursions at the output of the data demodulator 109 in response to phase reversals of the carrier signaling changes in state of the code-generator 8 output.

The discriminators 111 convert the output signals from the data demodulator 109 and the carrier demodulator 110 into a bi-level form. The data discriminator 74 producing the DATA signal indicates whether the data-demodulator 109 signal is above or below the 5-V reference and thus whether the carrier signal is in phase or 180° out of phase with the DATA-PHASE clock. The reference provided by resistors 71 and 72 for the discriminator 73 producing the DATA-HIGH signal is slightly above +5 V so that this discriminator 73 can indicate whether the amplitude of the carrier signal is sufficient for reliable data decoding.

The discriminator 87 producing the CARRIER signal is also referenced to +5 V and determines whether the ouput of the carrier demodulator 110 is high or low. The other discriminator 86 producing LOCK* indicates whether the output of the data demodulator 109 is above or below the output of the carrier demodulator 110. This output aids the bit synchronizer 15 in establishing the proper phase for the demodulation clocks.

Figure 4:
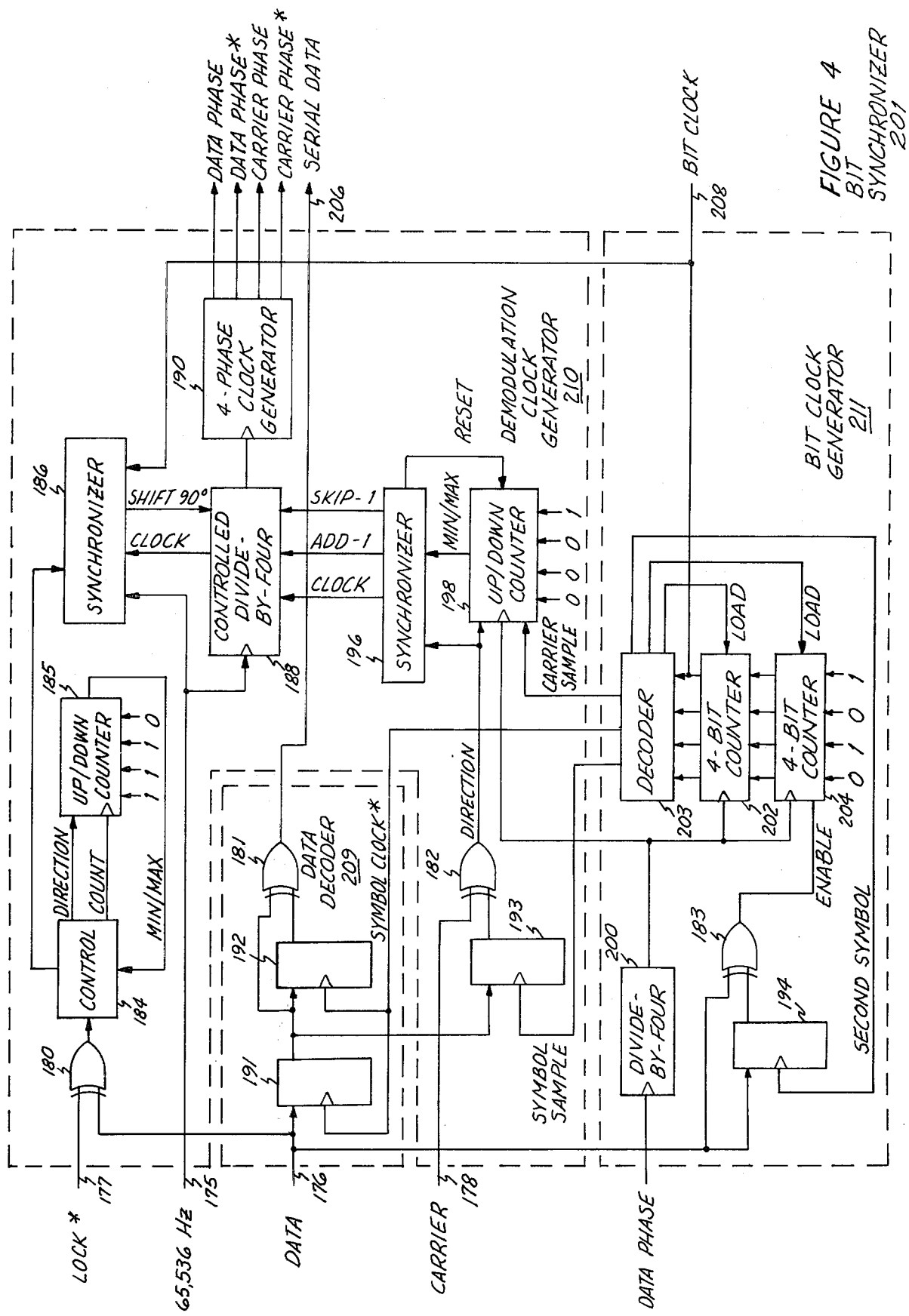
FIG. 4 is a detailed diagram of the preferred embodiment of the bit synchronizer shown in FIG. 1.

These discriminator 111 signals proceed to the data decoder 14 shown in FIG. 4 for the preferred embodiment.

The bit synchronizer 15 operates the demodulators 109 and 110 to recover serial data and bit clock from the modulated carrier signal transmitted over the interconnecting cable 12. The logic diagram in FIG. 4 illustrates the detailed design of the bit synchronizer in this embodiment. The bit synchronizer 201 comprises the three major functional elements, enclosed within dashed lines in FIG. 4, of the demodulation clock generator 210, the bit-clock generator 211 and the data decoder 209. The operation of each of these three logic circuits depends upon the data modulation method used in this embodiment.

Because 180° phase-shift keying is used for modulation, the demodulation clock may be synchronized to the carrier phase by causing the switches 76 in carrier signal demodulator 110 to change position at the time the carrier signal passes through a maximum, in which case the data demodulator 109 will produce a maximum signal amplitude, providing optimal signal recovery, if it samples the carrier 90°, or ¼ cycle of the 4096-Hz carrier clock, later. Because bi-phase mark encoding is used, the value of the first symbol in each bit is known to be opposite from the value of the second symbol in the preceeding bit. Thus the value of the carrier phase —0° or 180° — can be combined with the average value of carrier 178 to instruct the phase-shifting circuits within the demodulation clock generator 210 to approach a null condition.

Because bi-phase mark data always has a transition at the edge of a bit time, the bit clock may by synchronized to the received string of symbols by measuring the average value of data 176 for a time interval centered on the expected time of transition at the end of the second symbol in the bit. By sampling the value of data 176 midway through the symbol, the phase of the bit clock signal may be adjusted in the direction required to make the average value of data 176½. Measuring the average values for a narrow interval that occurs with the bit-clock period eliminates the effect of the data-1 transitions in the middle of the bit; furthermore by assuring that data-zeros are present in the sync word and by designing the slew-rate of the bit-clock phase-adjusting loop appropriately, we can assure that the bit clock is properly synchronized to data within one 2.5-second data frame. The bit-clock generator 211 will thus adjust the signal bit clock 208 into synchronism with the data stream within one frame.

Because the data bit comprises different symbols if the data value is a logic 1, and identical symbols if data value is zero, comparison of the first and second symbols in each bit using an exclusive-OR gate will produce serial data 206 that is valid during the second symbol of each bit, and is zero during the first symbol of each bit. Sampling this data at the proper time produces serial data for the demodulator.

Figure 3:
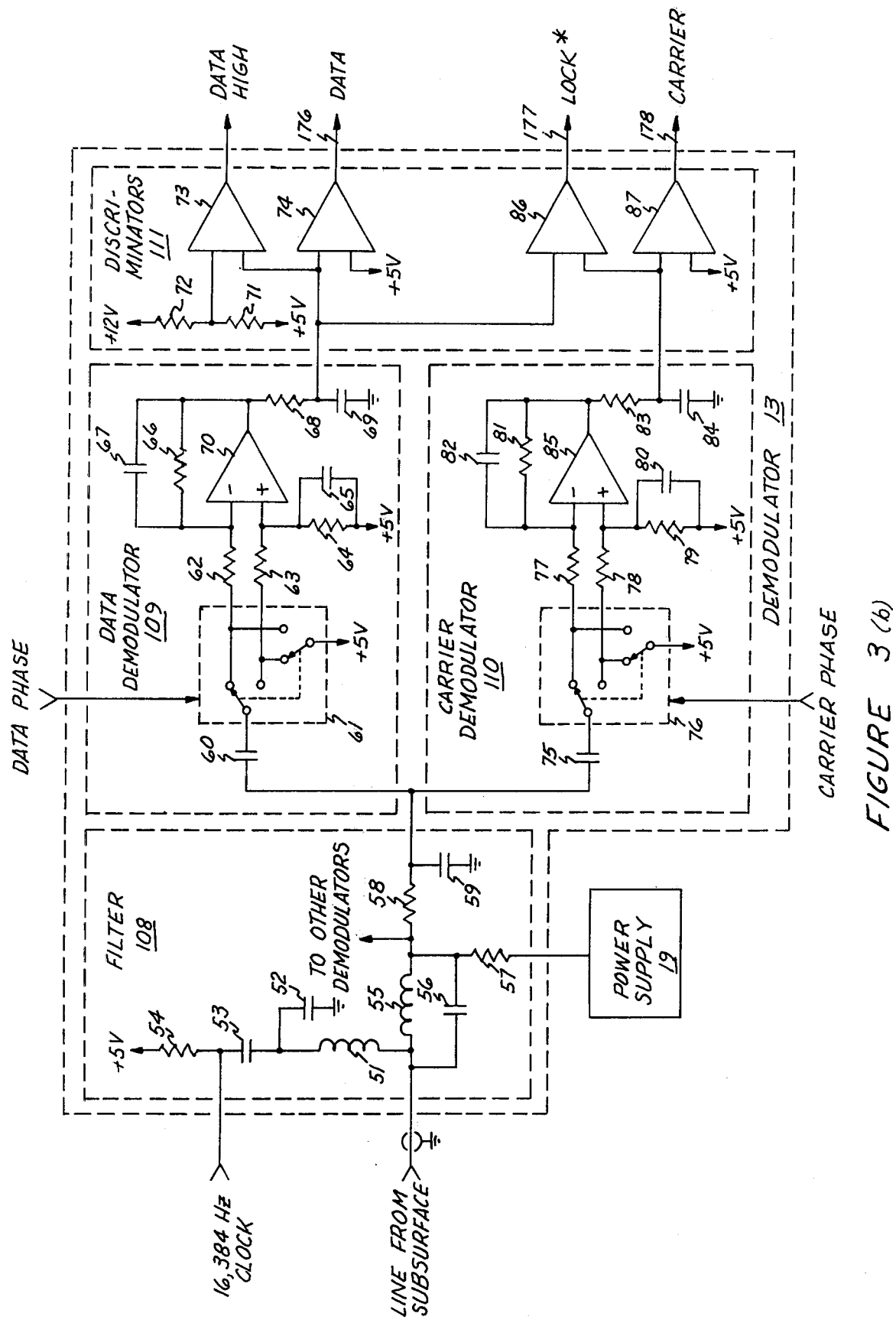

The logic shown within the demodulation clock generator 210 operates upon the 65,536-Hz clock signal 175 using a controlled divide-by-four 188 coupled to a 4-phase clock generator 190 to generate the clock phases required to operate the demodulator 13 shown in FIG. 3. The 4-phase clock generator 190 is a conventional 2-bit feedback shift register implemented with D-type flip-flops with the negation output of the second flip-flop connected to the D input of the first.

Control of generator 190 is performed in the controlled divide-by-four 188 circuit, where the 65,536 Hz 175 is divided by four. Control of 188 is by the skip-1 and add-1 signals, which cause circuit 188 to skip or delay by one cycle of the 65,536-Hz clock, corresponding to a retardation or advance of 21¼° in the phase of the clock generator 190 output, respectively. The skip signal causes the controlled divide-by-four 188 to pause for four cycles of the 65,536-Hz 175 clock to produce a 90° phase shift in the demodulator clocks. The add and skip signals are produced by the circuit comprising synchronizer 196, up/down counter 198, exclusive-OR gate 182, and D-type flip-flop 193. This circuit measures the average value of the signal carrier 178 during the time that the carrier sample signal from the bit-clock decoder 203 is present. The average is measured by causing carrier 178 to control the direction in which counter 198 counts, while the counting is controlled by an enable signal (carrier sample) and a clock from the bit clock generator 211 to be 3 counts during the first symbol of each bit. The direction in which counter 198 moves in response to a logic 1 level at the carrier 178 input is determined by using flip-flop 193 to store the value of data 176 the immediately-preceding symbol, and using this information in an exclusive-OR arrangement with data 176 to set the direction. Skip or add pulses are generated by synchronizer 196 whenever up/down counter 198 reaches the minimum 0 or maximum 15 state, respectively. Synchronizer 196 also resets counter 198 to 8, the middle of its range, when a skip or add is produced.

The shift-90 signal is required to avoid a situation where the average value of carrier 178 is zero not because it is nulled, but rather because it is swinging from one limit to the other. This anomalous pattern can exist stably under certain data patterns.

The shift-90 signal is generated by exclusive-OR gate 180, control 184, up-down counter 185 and synchronizer 186 in a manner similar to that described for the skip/add logic above, except that the criteria for skip-90 is the occurrence of the signal LOCK* 177 when data 176 is a logic 1 during seven successive bits. When LOCK* 177 and data 176 are both logic 1 during a defined time within a bit, control 184 causes counter 185 to count up; if LOCK* 177 is low when data 176 is high, counter 185 counts down. If counter 185 reaches the minimum-count value of zero, then control 184 sets counter 185 to 7; if counter 185 reaches the maximum-count value of 15, then control 184 sets counter 185 to 7 and generates a shift 90 signal.

The bit clock generator 211 uses the 4096-Hz DATA PHASE signal from demodulation clock generator 210 to produce the signal bit clock 208 properly synchronized to the appropriate data transitions. Divide-by-four 200 produces a 1024-Hz signal that is applied to a 4-bit counter 202. The bit clock frequency of 64 Hz is the output from the most-significant bit of counter 202. The phase of counter 202 is adjusted using 4-bit counter 204 to measure the average value of data 176 during the bit-edge transition time, and to correct the phase of bit-counter 202 by forcing bit-counter 202 to the correct value at a specific time. Flip-flop 194 and exclusive-OR gate 183 allow the phase-control counter 204 to increment only after the data transition has occurred. If the data transition and bit clock 208 are synchronized, then at the time that counters 202 and 204 are forced into agreement, the two counters will agree and no phase adjustment will occur.

Data decoder 209 produces serial data 206 by the exclusive-OR of the two symbols in each bit. Serial data 206 is thus always 1 when the second symbol of a bit is in flip-flop 192, because this means that the first symbol of the preceding bit is in flip-flop 191. Serial data 206 is equal to the recovered data signal one-half a bit time, or one symbol clock, later when the value of both the symbols corresponding to one bit are in flip-flop 191 and 192.

Figure 5:
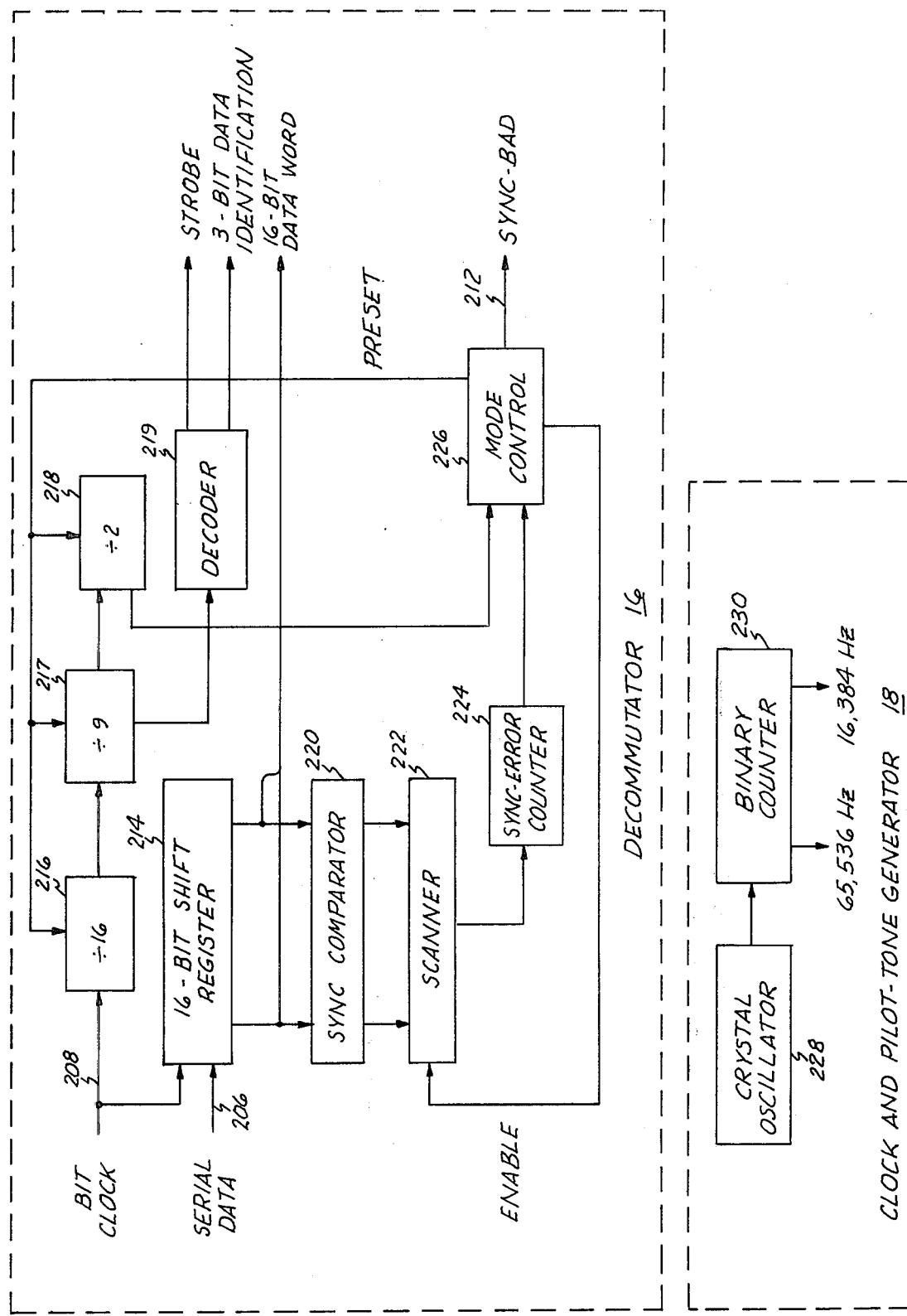
FIG. 5 is a detailed diagram of the preferred embodiment of the decommutator and clock-and-pilot-tone generator shown in FIG. 1.

The decommutator 16 receives the serial data 206 and the synchronized bit clock 208 signals from the bit synchronizer 15, and produces 19-bit data words with 16 bits of information and a 3-bit data-source identification accompanied by a strobe pulse for timing for use by data conditioning circuits 17. FIG. 5 is a block diagram of the decommutator 16 and the clock and pilot-tone generator 18.

Bit clock is counted down in counters 216, 217 and 218 to identify bits, words and frames, respectively. The word counter 217 is decoded in decoder 219 to produce the data identification code and strobe pulse for the data conditioning circuits 17. The frame counter 218 keeps track of the alternating pattern of one's and temperature data and inserted adjacent to the sync code. The counters 216, 217 and 218 interact with the mode control 226 to initially find sync in a SEARCH mode of operation, and then to confirm that synchronism between the counters 216, 217 and 218 and the serial data stream is maintained in a MONITOR mode.

The 16-bit shift register 214 assembles the 16 bits of serial data into parallel form for use by sync comparator 220 and by the data conditioning circuits 17. The sync comparator 220 compares each bit of register 214 with the sync pattern and presents the results of the comparison on 16 lines to scanner 222. When enabled, scanner 222 sequentially examines the 16 inputs from sync comparator 220 and generates one pulse for each mismatch for counting by the sync-error counter 224. The sync error counter 224 provides mode control 226 with signals about the number of bits not matching the sync pattern - 0, 1 or more than 1. The mode control 226 enters search mode and enables once each bit time scanner 222 if the error count exceeds 1. When the 16-bit pattern in register 214 matches the sync pattern with zero errors, the mode control 226 presets counters 216, 217 and 218 and disables scanner 222 for one frame (144 bits). Scanner 222 is then re-enabled, and if zero errors are again observed the sync-bad output 212 becomes false and the monitor mode is entered. If any errors are detected, search mode is re-entered. The monitor mode remains in effect as long as each frame, when scanner 222 is enabled; no more than one count is registered by sync-error counter 224 as a result of comparator 220 and scanner 222 examining the agreement between the sync pattern and the 16-bit data word that should contain sync.

The clock and pilot tone generator 18 comprises a 1.0485-MHz quartz-crystal-stabilized oscillator 228 and a binary counter 230. This produces the 16,385-Hz logic-level signal that synchronizes the surface and subsurface equipment. The 1,0486MHz clock provides the time base for all clock signals used for the data decoder 14 circuits.

Figure 6:
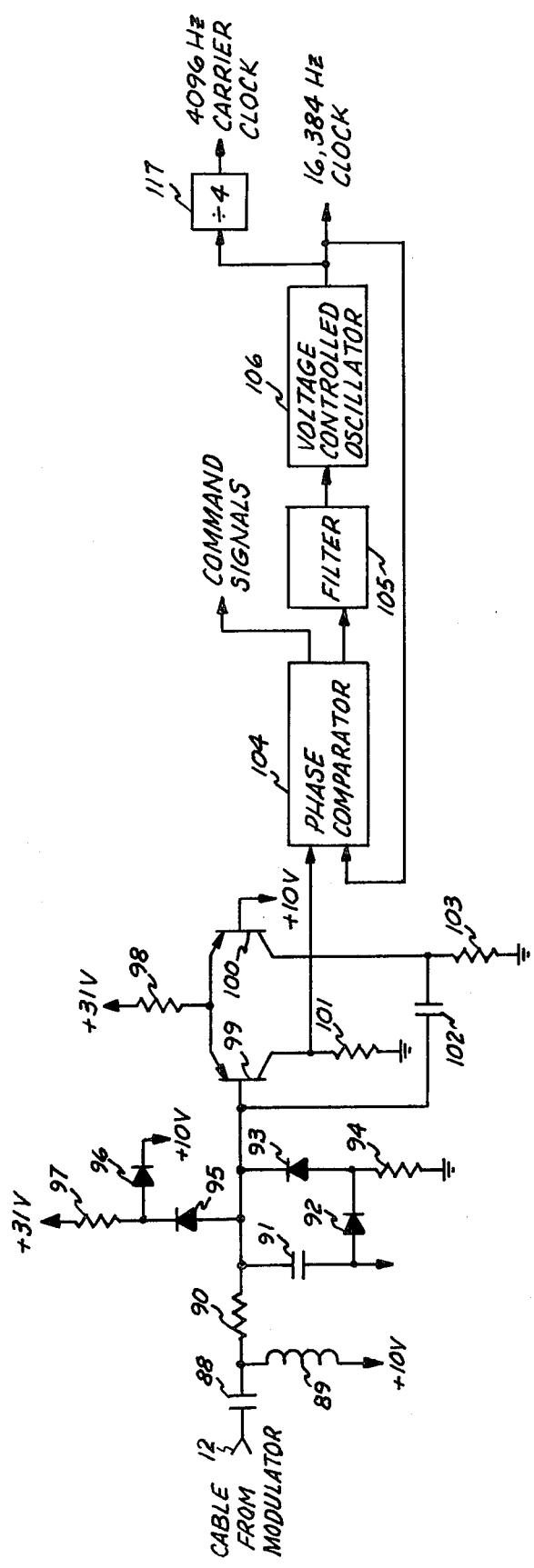
FIG. 6 is a detailed diagram of the preferred embodiment of the pilot-tone and command receiver shown in FIG. 1.

Although the carrier frequency being an exact binary multiple of a clock frequency available at the surface is not essential to this invention, this relationship, has simplified the design of many parts of this improved digital telemetering system 20. FIG. 6 illustrates the method whereby the pilot tone carrying this frequency information from the surface can be received at the subsurface end of the cable 12 to provide a subsurface reference frequency for the generation of the carrier frequency.

A series-tuned circuit 88 and 89 resonant at the pilot-tone frequency of 16,384 Hz in the preferred embodiment selects this signal from amongst a multiplicity of signals on the cable 12. Because at this end of the cable 12 the carrier signals can be considerably larger than the pilot tone owing to cable 12 attenuation, it is necessary to enhance signals at the pilot-tone frequency with respect to signals at the carrier and other noise frequencies. The resulting signal enters through resistor 90 a clamping circuit consisting of diodes 92, 93, 95 and 96 referenced to +10 V. The current in resistors 94 and 97 place diodes 92 and 96 in conduction to prevent resistor 90 from loading the tuned circuit 88 and 89 too severely for small pilot-tone signals. Capacitor 91 attenuates high-frequency noise.

The clamping-circuit signal is applied to a Schmitt-trigger circuit consisting of components 98, 99, 100, 101, 102 and 103. This circuit uses positive feedback through capacitor 102 to provide a distinct output whenever its input signal crosses its threshold voltage with a value given approximately by the +10 -V reference. These standarized pulses enter a phase comparator 104, which forms a part of a phase-locked loop. The other components in the phase-locked loop are a filter 105, which provides stability against loop oscillation and smoothing of noise, and a voltage-controlled oscillator 106, which generates the 16,384-Hz CLOCK. A binary divider 117 generates the 4096-Hz CARRIER CLOCK from the 16,384-Hz CLOCK.

The output of the Schmitt-trigger circuit 99 and 100 could be used directly as the source of the 16,384-Hz CLOCK if the cable 12 were free of noise. However, the presence of noise, including occasional poor connections in slip rings usually connecting the cable 12 to the surface equipment, would then cause an unacceptable jitter in the clock signal. The use of a phase-locked loop with a slow response time will smooth these variations, providing a nearly jitter-free clock signal for the subsurface equipment.

A second use of the phase-lock loop is as a command detector. If the surface equipment suddenly reverses the phase of the pilot tone, then the phase comparator 104 will produce a large transient at its output to bring the 16,384-Hz CLOCK back into phase synchronism with the pilot tone. This signal from the phase comparator 104 can signal the receipt of a command to the subsurface equipment.

What is claimed as new is:
1. For use in combination with subsurface instrumentation having at least one information source placed in a borehole and connected to the surface by a cable, an improved digital telemetering system for transmitting data therefrom to the vicinity of the surface, said information source producing data corresponding to and representative of the value of at least one parameter describing the subsurface environment, the improved system comprising:
  a. data-encoding means operatively associated with the subsurface instrumentation for generating digital data representing the value of at least one measured parameter and for arranging the position of the individual data bits in a sequence of a multiplicity of such bits so that each bit bears a known relationship of a specific parameter;
  b. modulating means operatively associated with the data-encoding means and the cable to the vicinity of the surface for providing electrical signals representative of the digital data from the data-encoding means, said electrical signals being capable of traveling over the cable to the vicinity of the surface;
  c. demodulating means operatively associated with the cable in the vicinity of the surface for converting the electrical signals produced by the modulating means into digital data; and
  d. data-decoding means operatively associated with the demodulating means for recognizing the significance of the individual data bits based on their position in a sequence of a multiplicity of such bits and for using this information to arrange the digital data in a useful form.

2. The system of claim 1, above, wherein the cable connecting the subsurface equipment to that in the vicinity of the surface comprises a pair of conductors, which carry both the modulator signals and the electrical power to operate the subsurface equipment, said system further comprising:
a. a power supply connected to the cable in the vicinity of the surface for placing an electrical potential between the two conductors of the cable, said power supply generating output frequencies different from those used to convey data along the cable;
b. a power conditioner connected to the cable near its subsurface end for producing voltages and currents to operate the subsurface equipment; and
c. isolation means comprising frequency-separation circuits operatively associated with the modulating means and the demodulating means for preventing destructive interference between the power-supply potential and the electrical signals from the modulating means.

3. the system of claim 1, above, wherein the data-encoding means comprises:
a. counting means operatively associated with each information source contained in the subsurface instrumentation which produces information in the form of the repetition rate of pulses of fixed or variable amplitude with the interval between pulses being fixed, variable or randomly variable, said counting means producing a digital representation of the average pulse repetition frequency during a defined time period;
b. analog-to-digital-conversion means operatively associated with each information source contained in the subsurface instrumentation which produces information in the form of the amplitude of pulses or slowly-varying alalog signals, said analog-to-digital-conversion means producing a digital representation of the amplitude of said analog signals;
c. sequencing means operatively associated with the counting means and the analog-to-digital-conversion means comprising digital circuits, which organize the data from a plurality of information sources into digital words, each of which corresponds to a single information source, said words being further grouped into frames, each of which contains a synchronization word; said sequencing means further providing timing, sequencing and control signals as needed by the subsurface instrumentation, the counting means and the analog-to-digital-conversion means, and also being capable of receiving such signals from this equipment,
whereby information from a plurality of source may be contained without ambiguity in a single, serial sequence of data bits; and
d. code-generating means operatively associated with the sequencing means comprising digital circuits, which convert the serial, binary output of the sequencing means into a second sequence of signals characterized by being suitable for detection and decoding at the other end of long lengths of cable in an error-free, unambiguous manner.

4. The system of claim 3, above, wherein the data-decoding means comprises:
a. bit-synchronizing means operatively associated with the data output of the demodulating means for producing serial non-return-to-zero (NRZ) data bits from the digital symbols generated by the demodulating means and for producing a clocking signal synchronized to the time of arrival of the bit edges; and
b. decommutating means operatively associated with the bit-synchronizing means for examining the data stream from the bit-synchronizing means to locate the synchronization word, for using this location to identify the data bits for each information source, and then for organizing these bits into words comprising identification and data bits.

5. The system of claim 4, above, further comprising data-conditioning circuits operatively associated with the output of the data-decoding means, said circuits providing analog and digital outputs for further processing, storage and display of the measured subsurface parameters.

6. The system of claim 1, above, wherein the data-encoding means comprises code-generating means produces at the output of the data-encoding means a bi-phase representation of the serial data at the input of the code-generating means.

7. The system of claim 1, above, wherein the modulating means comprises:
a. mixing means operatively associated with the data-encoding means for combining data signals with a carrier signal to modulate said carrier signal; and
b. tuned circuits operatively associated with the mixing means and the cable for placing the modulated carrier on the cable in such a manner that other modulated carriers at other carrier frequencies may also be present on the cable without destructive interference,
whereby data from multiple independent sources can be transmitted unambiguously over a single pair of conductors.

8. The system of claim 1, above, wherein the modulating means comprises mixing means operatively associated with the data-encoding means, said mixing means changing the phase of a carrier signal by a defined amount whenever the data produced by the data-encoding means changes state,
thereby producing phase-shift-key modulation of the carrier signal.

9. The system of claim 1, above, further comprising;
a. pilot-tone generating means operatively associated with the cable in the vicinity of the surface; and
b. pilot-tone receiving means operatively associated with the cable at a point near the subsurface equipment,
whereby a known frequency can be transmitted from a location near the surface to the subsurface equipment to provide a stable reference frequency for the subsurface equipment and to allow any carrier frequencies used by a modulating means to be exact rational fractions of a frequency available at the vicinity of the surface.

10. The system of claim 9, above, wherein the equipment located near the surface contains means for modulating the pilot tone in order to send commands to the subsurface instrumentation.

11. The system of claim 9, above, wherein the modulating means utilizes 180° phase-shift keying for modulation of the carrier signal; the demodulating means comprising:
a. filtering means operatively associated with the cable near the surface for passing those frequencies near the carrier frequency of the subsurface modulating means whose signal is to be demodulated, while attenuating other frequencies;
b. first synchronous-rectifying and smoothing means operatively associated with the filtering means, said rectification and smoothing means producing a slowly-varying output signal, the amplitude of which depends on the relative phase between the portion of the signal at the output of the filtering means which is at the modulator carrier frequency and a control signal with a frequency equal to the rational fraction of the pilot-tone frequency corresponding to the modulator carrier frequency;

c. second synchronous-rectifying and smoothing means also operatively associated with the output of the filtering means using a control signal with a fixed 90° phase shift with respect to the control signal for the first synchronous-rectifying and smoothing means;

d. discrimination means operatively associated with the outputs of the two synchronous-rectifying and smoothing means for producing bi-level signals; and e. digital-feedback means operatively associated with the outputs of the discrimination means for providing the two control signals for the synchronous-rectifying and smoothing means, said digital-feedback means varying the phase of the control signals with respect to the pilot tone in such a manner so as to minimize the amplitude of the output signal from the first synchronous-rectifying and smoothing means, thereby maximizing the magnitude of the output signal from the second synchronous-rectifying and smoothing means in response to the phase reversals produced by the subsurface modulating means and ensuring that the output from the part of the discrimination means operatively associated with the second synchronous-rectifying and smoothing means becomes an accurate bi-level representation of the digital data entering the subsurface modulating means.

12. The system of claim 1, above, further comprising a second digital telemetering link arranged to transmit information from the vicinity of the surface to the subsurface equipment, whereby equipment near the surface can command and control the subsurface equipment.

13. For use in combination with subsurface instrumentation having at least one information source placed in a borehole and connected to the surface by a cable, an improved digital telemetering system for transmitting data therefrom to the vicinity of the surface, said information source producing data corresponding to and representative of the value of at least one parameter describing the subsurface environment, the improved system comprising:

a. data-encoding means operatively associated with the subsurface instrumentation comprising analog and digital circuits for generating digital data representing the value of at least one measured parameter, for organizing these data bits into digital words and frames wherein the position of the individual data bits in a sequence of a multiplicity of such bits provides a known relationship to the measurement of a specific parameter, and for providing a serial bi-phase representation of the organized data bits;

b. modulating means operatively associated with the data-encoding means and the cable to the vicinity of the surface comprising tuned circuits and switching circuits for providing a telemetry signal on the cable utilizing a carrier signal with a frequency which is an exact rational fraction of the frequency of a reference signal provided by the surface equipment and for providing phase-shift-key modulation of this carrier signal, said modulated carrier signal being capable of traveling over the cable to the surface in the presence of and not destructively interfering with other signals possibly also on the cable;

c. demodulating means operatively associated with the cable in the vicinity of the surface comprising phase-sensitive detectors operating from clock signals derived from the same reference frequency as that used in the modulating means for converting the modulated carrier signals reaching the surface into digital data;

d. data-decoding means operatively associated with the demodulating means comprising digital circuits for recognizing the significance of the individual data bits based on their position in a sequence of a multiplicity of such bits organized into digital words and frames and for using this information to arrange the digital data in a useful form comprising identification and data bits;

e. clock and pilot-tone generating means comprising a crystal oscillator, binary division circuits and tuned circuits operatively associated with the cable in the vicinity of the surface and with other surface equipment for producing reference frequencies for the surface equipment and for producing a pilot tone capable of being placed on the cable in a manner which does not destructively interfere with the other signals on the cable; and f. pilot-tone receiving means comprising tuned circuits and a phase-locked loop operatively associated with the cable and other equipment at the subsurface end of the cable for generating a reference clock with a frequency equal to that of the pilot tone, said clock providing a stable time base for the subsurface equipment and allowing the carrier frequency in the modulating means to be exact rational fraction of a reference frequency provided by the surface equipment, whereby information can be transmitted form the subsurface equipment to the surface in an error-free, unambiguous manner.

14. The system of claim 13, above, wherein the cable connecting the subsurface equipment to that in the vicinity of the surface comprises a pair of conductors, which carry both the modulated carrier signals and the electrical power to operate the subsurface equipment, said system further comprising:

a. a power supply connected to the cable in the vicinity of the surface for placing an electrical potential between the two conductors of the cable, said power supply generating output frequencies different from those used to convey data along the cable;

b. a power conditioner connected to the cable near its subsurface end for producing voltages and currents to operate the subsurface equipment; and c. isolation means comprising frequency-separation circuits operatively associated with the modulating means and the demodulating means for preventing destructive interference between the power-supply potential and the electrical signals from the modulating means and from the clock and pilot-tone generating means.

15. The system of claim 13, above, wherein at least one information source has a radiation detector producing output pulses at an average rate representative of the level of radiation detected, the data-encoding means comprising:

a. amplifier-discriminator means operatively associated with the radiation detector for producing bi-level pulses of standard amplitude whenever the radiation detector produces a pulse within defined levels;

b. counting means operatively associated with the amplifier-discriminator means for totalizing the number of pulses produced during known time intervals by the amplifier-discriminator means, whereby said counting means produces a digital representation of the average pulse repetition frequency during the known time interval;

c. sequencing means operatively associated with the counting means for determining the known time interval during which the counting means counts pulses, for organizing the data bits provided by the counting means and other information sources into a known serial NRZ format comprising digital words and frames, and for supplying the synchronization word defining each frame; and d. code-generating means operatively associated with the sequencing means for converting NRZ data into bi-phase data, whereby the serial output data represents a bi-phase, formatted encoding of at least the average pulse repetition rates during known intervals.

16. The system of claim 13, above, wherein at least one information source has a temperature-sensitive element, the data-encoding means comprising:

a. oscillating means operatively associated with the temperature-sensitive element, the frequency of which is determined by the temperature of said element;

b. counting means operatively associated with the oscillating means for determining the frequency thereof by counting pulses during known time intervals;

c. sequencing operatively associated with counting means for determining the known time interval during which the counting means counts oscillator pulses, for organizing the data bits provided by the counting means and other information sources into a known serial NRZ format comprising digital words and frames, and for supplying the synchronization word defining each frame; and d. code-generating means operatively associated with the sequencing means for converting NRZ data into bi-phase data, whereby the serial output data represent a bi-phase, formatted encoding of at least the temperature of the temperature sensitive element.

17. The system of claim 13, above, wherein at least one information source is a locator of pipe collars, the data encoding means comprising:

a. amplifier-discriminator means operatively associated with the pipe-collar locator for providing a bi-level signal whenever the subsurface equipment travels past a collar in the surrounding pipe;

b. sequencing means operatively associated with the amplifier-discriminator means and other data sources for organizing digital data provided by the amplifier-discriminator means and other information sources into a known serial NRZ format comprising digital words and frames, and for supplying the synchronization word defining each frame; and c. code-generating means operatively associated with the sequencing means for converting NRZ data into bi-phase data, whereby the serial output data represent a bi-phase, formatted encoding of at least the times when the subsurface equipment passed collars in the surrounding pipe.

18. The system of claim 13, above, wherein the modulating means comprises:

a. mixing means comprising a transformer and switches operatively associated with the data-encoding means and the cable for reversing the phase of the carrier signal to modulate said carrier signal by the phase-shift-key technique; and b. tuned circuits operatively associated with the mixing means and the cable for placing the modulated carrier on the cable and for terminating said cable in its characteristic impedance to reduce reflected signals traveling along the length of the cable and to permit other modulated carriers to be present simultaneously without destructive interference, whereby data from multiple independent sources can be transmitted unambiguously over a single pair of conductors using different carrier frequencies.

19. The system of claim 13, above, wherein the demodulating means comprises:

a. filtering means operatively associated with the cable near the surface for passing those frequencies near the carrier frequency of the subsurface modulating means whose signal is to be demodulated, while attenuating other frequencies including the pilot tone;

b. first synchronous-rectifying and smoothing means comprising a full-wave demodulator followed by a filtering amplifier operatively associated with the filtering means, said rectification and smoothing means producing a slowly varying output signal, the amplitude of which depends on the relative phase between the portion of the signal at the output of filtering means which is at the modulator carrier frequency and a control signal with a frequency equal to the rational fraction of the pilot-tone frequency corresponding to the modulator carrier frequency;

c. second synchronous-rectifying and smoothing means also comprising a full-wave demodulator followed by a filtering amplifier operatively associated with the output of the filtering means and using a control signal with a fixed 90° phase shift with respect to the control signal for the first synchronous rectifying and smoothing means;

d. discrimination means operatively associated with the outputs of the two synchronous-rectifying and smoothing means for producing bi-level signals; and e. digital-feedback means operatively associated with the outputs of the discrimination means for providing the two control signals for the synchronous-rectifying and smoothing means, said digital-feedback means varying the phase of the control signals with respect to the pilot tone in such a manner so as to minimize the amplitude of the output signal from the first synchronous-rectifying and smoothing means, thereby maximizing the magnitude of the output signal from the second synchronous-rectifying and smoothing means in response to the phase reversals produced by the subsurface modulating means and ensuring that the out put from the part of the discrimination means operatively associated with the second synchronous-rectifying and smoothing means becomes an accurate bi-level representation of the digital data entering the subsurface modulating means.

20. The system of claim 13, above, wherein the data-decoding means comprises:
   a. bit-synchronizing means comprising digital circuits operatively associated with the data output of the demodulating means for producing serial data bits from the digital symbols generated by the demodulating means and for producing a clocking signal synchronized to the time of arrival of the bit edges; and
   b. decommutating means comprising digital circuits operatively associated with the bit-synchronizing means for examining data steam from the bit-synchronizing means to locate the synchronization word, for using this location to identify the data bits for each information source, and then for organizing these bits into words comprising identification and data bits.

21. The system of claim 13, above, further comprising data-conditioning circuits operatively associated with the output of the data-decoding means, said circuits providing analog and digital outputs for further processing, storage and display of a measured subsurface parameter.

22. The system of claim 13, above wherein the equipment located near the surface contains means for modulating the pilot tone in order to send commands to the subsurface instrumentation.

23. The system of claim 13, above, further comprising a second digital telemetering link arranged to transmit information from the vicinity of the surface to the subsurface equipment,
   whereby equipment near the surface can command and control the subsurface equipment.

* * * * *